United States Patent

[11] 3,617,187

[72] Inventors Toshizo Chitani;
Shikanosuke Yokoyama; Shinko Nishide, all of Tokyo, Japan
[21] Appl. No. 656,305
[22] Filed July 10, 1967
[45] Patented Nov. 2, 1971
[73] Assignees Hakuyosha Co., Ltd.;
Toshizo Chitani,
part interest to each
[32] Priorities July 18, 1966
[33] Japan
[31] 41/46559;
July 18, 1966, Japan, No. 41/46560; Nov. 2, 1966, Japan, No. 41/71954

[54] PROCESS FOR PREPARATION OF SILICONE GRAFT COPOLYMERIZED FIBER OR CLOTH
5 Claims, No Drawings
[52] U.S. Cl..................................................... 8/115.5,
8/115.6, 8/2, 8/17, 8/165, 117/93.31, 204/159.13
[51] Int. Cl...................................................... D06m 11/00,
D06p 5/02
[50] Field of Search........................................ 8/DIG. 1,
DIG. 18, 74, 2, 17, 18, 115.5; 117/93.31;
204/159.13

[56] References Cited
UNITED STATES PATENTS
| | | | |
|---|---|---|---|
| 2,959,569 | 11/1960 | Warrick........................ | 8/DIG. 18 |
| 2,979,447 | 4/1961 | Levine.......................... | 8/DIG. 18 |
| 3,068,122 | 12/1962 | Cline et al.................... | 8/DIG. 18 |

FOREIGN PATENTS
| | | | |
|---|---|---|---|
| 717,638 | 10/1954 | Great Britain................ | 8/18 |
| 758,735 | 10/1956 | Great Britain................ | 8/2 |
| 828,822 | 2/1960 | Great Britain................ | 8/DIG. 1 |

Primary Examiner—George F. Lesmes
Assistant Examiner—John R. Miller
Attorney—Wenderoth, Lind & Ponack ABSTRACT: A silicone graft copolymerized fiber or cloth is prepared by first dyeing the cloth with a dyestuff containing metal in the form of a complex salt, and then applying a silicone having a general formula of H20001000

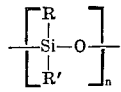

wherein R and R$^1$ are hydrogen or alkyl radicals up to five carbon atoms and R and R$^1$ can be the same or different, and n is an integer, to the dyed cloth and subjecting said silicone coated dyed cloth to an ionizing radiation wherein the dosage of said ionizing radiation is within a range of from $10^4$ rad. to $10^7$ rad.

PROCESS FOR PREPARATION OF SILICONE GRAFT COPOLYMERIZED FIBER OR CLOTH

BACKGROUND OF THE INVENTION

It has been known prior to the invention that silicone grafted copolymer can be made by applying silicone to fiber, thereafter subjecting to irradiation by ionizing radiation on the order of from about $10^4$ to $10^7$ rad. However, in the known process, the degree of grafting is very low. For example, the degree of grafting is on the order of 2.4 percent by weight (silicone/fiber), even if silicone is applied to fiber in an amount of 100 percent by weight (silicone/fiber), and irradiation of $5 \times 10^5$ rad by ionizing radiation is used. In another example, the degree of grafting is on the order of 0.9 percent by weight (silicone/fiber), when silicone is applied to fiber in an amount of 5 percent by weight (silicone/fiber), which is the proportion generally adopted in industrial operations, and ionizing radiation is irradiated $4 \times 10^6$ rad. If the total dose of irradiation of ionizing radiation is increased to increase the degree of grafting, the tensile strength of the fiber or cloth significantly decreases in proportion to the increase of total dose in irradiation. Accordingly, in practice, it is necessary to develop a process which carries out silicone graft polymerization efficiently using lower dose of irradiation.

The process for graft copolymerizing silicone with a fiber is useful as a process for giving a water proof finish for a fiber, since the copolymer obtained is water proof. However, in the known prior art, because of the low degree of grafting in the copolymerized fiber obtained, the durability of water proofness disappears after being subjected a few times to commercial drycleaning.

SUMMARY OF THE INVENTION

In this invention, the inventors have overcome the deficiencies of known processes by the thorough study of the processes for preparing a silicone graft copolymerized fiber having a high degree of grafting and excellent durability of water proofness.

Accordingly, the primary object of the invention is to provide processes for preparing an improved silicone graft copolymerized fiber. Another object of this application is to provide improved processes for imparting a long lasting water proof finish to cloth.

A further object of this invention is to provide a silicone graft copolymerized fiber having a high degree of grafting and long lasting water proofness which could not be obtained by the prior processes. Other objects of this invention will be apparent from the following disclosure and examples.

The improved processes for preparing a silicone graft copolymerized fiber provided by this invention include the following processes.

The first process for preparing a silicone graft copolymerized fiber comprises copolymerizing silicone with fiber by irradiating fiber and silicone together with an ionizing radiation, characterized in that said irradiation is carried out under heating. This process reflects the inventors discovery that silicone graft copolymerized fiber having high degree of grafting and long lasting water proofness can be obtained when silicone is applied to fiber and subjected to irradiation by ionizing radiation under heating.

When silicone is applied to a fiber or cloth, and then expose to radiation, silicone is copolymerized with fiber. However, in the prior processes, the degree of grafting is very low. Accordingly, the life of water proofness obtained was short. However, when silicone coated fiber or cloth was exposed to irradiation under the heat in accordance with this invention, the radicals formed in the system of fiber or cloths and silicone enhance graft polymerization and accordingly, the degree of silicone grafting is increased even though the total dose of irradiation is low. Further, post polymerization of silicone itself which is graft polymerized with fiber or cloth is also promoted, thereby producing a silicone graft copolymerized fiber or cloth which has excellent durability of water proofness.

As for the fibers utilizable in the process of this invention, natural fiber, semisynthetic fiber and synthetic fiber and products thereof are included provided that they have a molecular construction which can form free radicals within a molecule when they are exposed to the radiation. Examples of such fiber are, cotton, wool, silk, Rayon, Acetate, Vinylon, polyethylene, polypropylene etc.

As for the silicone utilizable in the process of this invention, a compound which has a structure of the following general formula as an element of the molecule is suitable:

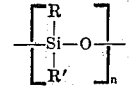

Wherein, R and R' are hydrogen or alkyl radicals having less than five (inclusive) carbon atoms and R and R' can be the same or different, and $n$ is an integer. Any suitable process such as impregnation, spraying or the like can be used for applying a silicone to the fiber or cloth. Also, in spraying or impregnation, water, methanol or other organic solvent can be used as a diluent for the silicone. If water or acetone is used as the solvent, it is unnecessary to remove the solvent prior to the exposure to the irradiation. In fact, sometimes, the presence of such solvent increases the effectiveness of the process.

Any of the ionizing radiations such as γ-ray, X-ray, electron beam, proton beam or neutron beam etc. can be used in this process. The suitable total dose of the irradiation is within the range of from $10^4$ rad to $10^7$ rad. If the total dose of irradiation is less than the above-mentioned total dose of irradiation, the degree of grafting is low and the desired result cannot be obtained. If the total dose of irradiation is higher than the maximum above-mentioned, the properties of the treated fiber cloth change significantly, and the fiber cloth is not suitable for use.

In the process of this invention, it is necessary to carry out exposure to the irradiation while the fiber cloth is under heat. The temperature of the fiber cloth must be kept below the temperature the fiber cloth treated by the process can resist. For example, if the fiber treated in the process is polyvinylchloride, the temperature is less than 60° C.; if the fiber is polyethylene, less than 100° C.; if wool or polypropylene, less than 130° C.; cotton, vinylidene, nylon, less than 150° C.; less than 170° C. for silk, and when rayon, cupra, acetate, Vinylon, polyester, or polyacrylurea, the temperature is less than 200° C.

In the process of this invention, the treatment is complete after subjecting the article to irradiation under heated condition. However, if further heating is applied following irradiation, a more favorable result can be obtained.

A silicone graft copolymerized fiber obtained by the present process and the silicone graft copolymerized fiber obtained by the known prior processes were subjected to extraction using a solvent having ability to dissolve silicone such as petroleum benzine, and the respective degree of grafting compared. The degree of grafting of silicone copolymer obtained by a known process using a fabric on which silicone was applied on the order of 5 percent and irradiation of $4.0 \times 10^6$ rad was only in the order of 0.92 percent; contrary to this, the degree of grafting of silicone copolymerized fiber obtained by this process (i.e. which was irradiated of only $2.6 \times 10^6$ rad and heating to 80° C. was increased to 1.62 percent. Although total dose of irradiation was decreased to about 65 percent of the known process, the degree of grafting increased about 80 percent. Also, when water repellent test is made in accordance with the provision of ASTM; D583-58, it was found that water repellent rating of the product treated by the known prior process using $4.0 \times 10^6$ rad of irradiation decreased to water repellent rating 50 after 7 commercial drycleanings, on the other hand, water repellency of the product treated by the present process using $2.6 \times 10^6$ rad of irradiation decreased to rating 70. It is apparent that in maintaining water proofness of the product obtained by this process is far superior (70) to that of prior art (50).

The second process of this invention is a process for preparing a silicone graft copolymerized fiber which comprises copolymerizing silicone with a fiber or cloth by irradiation of the silicone and fiber, together with an ionizing radiation, characterized in that the fiber is dyed with a metal-containing dyestuff, silicone is thereafter applied to the dyed fiber, and the fiber then being subjected to an ionizing radiation. This process reflects the inventors' discovery that in the preparation of silicone graft copolymerized fiber, it was found if a fiber dyed with a metal-containing dyestuff is used as the fiber to be treated, graft copolymerization takes place effectively, and even if low total dose of irradiation is used, the degree of grafting is high, resulting in a silicone graft copolymer having excellent durability of water proofness.

In general, it is seldom that the water proof finish is given to white (undyed) cloth, usually, the water proof finish is given after dyeing. Accordingly, it is very advantageous if a good graft copolymerized fiber can be obtained using metal-containing dyestuff when dyeing is carried out.

All the fibers shown as utilizable in the first process of this application can be treated successfully by this second process.

Any of mono-azo dyestuffs, poly-azo dyestuffs and phthalocyanine dyestuffs are utilizable in this process, provided that they are metal-containing dyestuffs. In short, any dyestuff contains metal in its molecular structure can be used. It is preferable that the dyestuff contains the metal in the form of complex salt, since in this form the dyestuff has good efficiency even if a low irradiation dose is used. Further, any of dyeing processes generally used in the art can be used in this process. The degree of grafting, of course, varies in accordance with the concentration of the dyestuff, but in any event, the grafting rate is increased by use of this process.

Further, the silicone employed, the process for applying said silicone to the fiber cloth, the kind of radiation used and the total dosage of the irradiation are substantially the same as in the first process. In the process of this invention, after being irradiated, the finished article can be used without further processing; however in practice, it is preferable to heat again after the irradiation.

The silicone graft copolymerized fiber or cloth obtained in accordance with this process is, like that obtained in accordance with the first process, far superior in durability of water proofness and has a higher degree of grafting than that obtained by the known prior process.

The third process of this application is a process for preparing a fiber cloth incorporating a graft copolymer of silicone with thermosetting resin or thermoplastic resin characterized by applying a thermosetting resin or thermoplastic resin and silicone to fiber cloth, and subjecting the combination to irradiation by an ionizing radiation.

In the silicone graft copolymerized fiber cloth obtained by the known prior processes in which silicone only is grafted to the fiber cloth, the fiber cloth becomes slippery if the quantity of silicone added is increased beyond a certain point. However, in the process of this invention the silicone is grafted onto the fiber cloth in the presence of a thermosetting resin or thermoplastic resin and the processed fiber cloth retains both stiffness and softness to give a superior "feel." Further, the water proofness of the finished article is maintained significantly longer.

The same fiber cloth in the first process of this invention, can be used in this (the third) process. Further, the process is especially suitable for use with natural fiber and gives significant effect.

Any of the thermosetting resin and thermoplastic resins which are generally used for fiber cloth finish, such as melamine resin, urea resin, ethylene urea resin, acrylate resin or the like, can be used in this process, but a thermosetting resin is preferable. A fiber cloth incorporating a graft copolymer of silicone with a thermosetting resin retains its water proofness for an especially long time and is excellent for water proof finished fiber cloth. Any of the silicones mentioned in the first process of this invention can be used in this process. As for the process for applying the thermosetting resin, thermoplastic resin and silicone to the fiber cloth, any suitable process such as impregnation, spraying or the like, can be used. Further, it is possible to add an inorganic salt catalyst, organic amine catalyst to the treating solution, if it is desired to do so.

The kind of irradiation utilizable in this process and the total dose thereof are the same as in the first process of this application. In this process also, the finished article, after being irradiated, can be used without further processing; however, in practice, it is preferable to apply heat again after irradiation.

When a fiber cloth treated in accordance with this process is subjected to an extraction using petroleum benzine which has the ability to dissolve silicone as a solvent, it shows a weight increase in the same order or more than silicone copolymerized fiber. Above weight increase is calculated as follows:

weight increase (weight of grafted silicone)
= weight after extracted − (weight of fiber + weight of resin)

From the data above, it is apparent that not only is silicone added, but a fiber cloth incorporating a graft copolymer of silicone with thermosetting resin or thermoplastic resin is produced. Also, when tested for water repellency in accordance with the provisions of ASTM; D–583–58, it was found that water repellency of the cloth treated by the known prior process survived only few drycleanings, however, the cloth treated by this process retained a repellent rating of 80 even after more than 15 commercial drycleanings. It is recognized that the durability of water proofness is significantly increased by the treatment of this process. Incidentally, the commercial drycleaning test was carried out using the following apparatus and conditions:

| | |
|---|---|
| inside diameter of apparatus | 1 m. |
| number of revolutions per min. | 43 r.p.m. |
| liquor ratio | 8.1 |
| cleaning solution | |
| solvent Industrial gasoline No. 5 or JIS K 2201 | |
| detergent polyoxyethylene alkyl ester type | 9.72% |
| petroleum sulfonate type | 41.74% |
| detergent concentration | 1% |
| time for cleaning | 30 min. |
| rinse (solvent without addition of detergent) | 10 min. |

The above, three processes impart excellent characteristics respectively. It is also possible to combine the processes arbitrarily. By combining these processes suitably according to the object desired, a silicone graft copolymerized fiber cloth or a fiber cloth incorporating graft copolymer of silicone with thermosetting or thermoplastic resin and which is more suitable to the desired object can be obtained.

Accordingly, other processes of this invention are any combination of processes No. 1, 2 and 3 for preparing a silicone graft copolymerized fiber or a fiber incorporating copolymer of silicone with thermosetting or thermoplastic resin according to this invention. That is, the processes include a process for preparing a silicone graft copolymerized fiber cloth characterized by applying silicone to a fiber cloth which has been dyed with a metal-containing dyestuff, thereafter subjecting said treated fiber cloth to irradiation by an ionizing radiation under heating; a process for preparing a fiber cloth incorporating a graft copolymer of silicone with thermosetting or thermoplastic resin characterized by applying the thermosetting or thermoplastic resin and silicone to a fiber cloth, thereafter subjecting said treated fiber cloth to irradiation by an ionizing radiation under heating; a process for preparing a fiber cloth incorporating a graft copolymer of silicone with thermosetting or thermoplastic resin characterized by applying the thermosetting or thermoplastic resin and silicone to a fiber cloth which has been dyed with a metal-containing dyestuff, thereafter subjecting said treated fiber cloth to irradiation by an ionizing radiation; and a process for preparing a fiber incorporating a graft copolymer of silicone with thermosetting or thermoplastic resin characterized by applying the thermosetting or thermoplastic resin and silicone to a fiber cloth which has been dyed with a metal-containing dyestuff, thereafter subjecting said treated fiber cloth to irradiation by an ionizing radiation under heating.

It is apparent that all the fiber cloths, metal-containing dyestuff, silicone, thermosetting or thermoplastic resin, irradiation, etc. and the operating conditions such as temperature, etc. mentioned previously can be applied to this process.

The finish of this invention can be applied to fiber, yarn, fabric, cloth and secondary products thereof. Accordingly, the invention includes any products produced by the processes of this invention.

The invention is further described and illustrated by the following detailed examples.

EXAMPLE 1

1.5 g. of No. 60 cotton broad cloths on which silicone has been applied in an amount of 5 percent (silicone/fiber) was exposed to Co 60 $\gamma$-ray in the presence of air at temperatures of 50° C. and 80° C., thereafter the treated cloth was dried 5 hours at a temperature of 80° C. The cloth thus treated was subjected to an extraction with petroleum benzine as a solvent for 20 hours and rinsed sufficiently in methanol and water successively and dried. The weights of the measured cloths were as follows:

TABLE 1

| Sample No. | Irradiation temp. (° C.) | Irradiation total dose (rad.) | Degree of silicone grafting (percent) | Grafting yield (percent) |
|---|---|---|---|---|
| 1 | 80 | 1.2×10⁶ | 0.75 | 15 |
| 2 | 80 | 1.7×10⁶ | 0.75 | 15 |
| 3 | 80 | 2.6×10⁶ | 1.62 | 32 |
| 4 | 50 | 1.2×10⁶ | 0.57 | 11 |
| 5 | 50 | 1.7×10⁶ | 0.62 | 12 |
| 6 | 50 | 2.6×10⁶ | 0.85 | 17 |
| 7 | 25 | 1.3×10⁶ | 0.41 | 8 |
| 8 | 25 | 1.9×10⁶ | 0.59 | 12 |
| 9 | 25 | 4.0×10⁶ | 0.92 | 18 |
| 10 | 25 | 0 | −0.02 | 0 |

Sample Nos. 7–10 are shown for reference purposes only.

By the known process, the degree of grafting was only 0.92 percent even though 4.0×10⁶ rad of total dose was used. In contrast, by the process of this invention, the degree of grafting was 1.62 percent using 2.6×10⁶ rad of total dose keeping at a irradiation temperature of 80° C. These data clearly show the increase in degree of grafting by the irradiation under heated condition. Also, No. 60 cotton broad cloth on which silicone has been applied in an amount of 5 percent was exposed to Co 60 $\gamma$-ray in the present of air at temperatures of 50° C. and 80° C., thereafter drying was carried out for 5 hours at a temperature of 80° C. Cotton cloth thus treated was subjected commercial drycleaning in many times and was tested to determine the durability of water proofness in accordance with ASTM test; D583–58 for water repellency. The results are tabulated below as Table 2:

By the known process, spray test rating of water repellency decreased to 50 by 7 drycleanings even if the sample subjected 4.0×10⁶ of total dose of irradiation. In contrast, the cloth

TABLE 2

| Sample No. | Irradiation temperature (° C.) | Irradiation total dose (rad.) | Number of dry-cleanings subjected (spray test rating) | | | | | | | | | | |
|---|---|---|---|---|---|---|---|---|---|---|---|---|---|
| | | | 0 | 1 | 2 | 3 | 4 | 5 | 6 | 7 | 8 | 9 | 10 |
| 1 | 80 | 1.2×10⁶ | 100 | 90 | 80 | 80 | 80 | 70 | 50 | 50 | | | |
| 2 | 80 | 1.7×10⁶ | 100 | 100 | 90 | 80 | 80 | 80 | 70 | 50 | 50 | | |
| 3 | 80 | 2.6×10⁶ | 100 | 100 | 90 | 90 | 80 | 80 | 80 | 80 | 80 | 70 | 70 |
| 4 | 50 | 1.2×10⁶ | 100 | 90 | 80 | 80 | 70 | 50 | | | | | |
| 5 | 50 | 1.7×10⁶ | 100 | 90 | 90 | 80 | 70 | 70 | 50 | | | | |
| 6 | 50 | 2.6×10⁶ | 100 | 100 | 90 | 80 | 70 | 70 | 70 | | | | |
| 7 | 25 | 1.4×10⁶ | 100 | 80 | 80 | 70 | 50 | | | | | | |
| 8 | 25 | 1.9×10⁶ | 100 | 80 | 80 | 80 | 70 | 50 | | | | | |
| 9 | 25 | 4.0×10⁶ | 100 | 90 | 90 | 80 | 80 | 70 | 70 | 50 | | | |
| 10 | 25 | 0 | 90 | 80 | 70 | 50 | | | | | | | |

NOTE.—Samples No. 7–10 are shown for reference purposes only.

which has been subjected to 2.6×10⁶ rad of total dose of irradiation at a temperature of 80° C. shows super water repellency of 70 after 10 drycleanings. From the data, it is clearly recognized that by the process of this invention, the degree of water proofness of the treated cloth is significantly improved over that of the fabric treated with the prior art.

EXAMPLE 2

No. 60 cotton broad cloth was dyed using 0.6 percent and 2.0 percent of Solar Rubinol B (a kind of copper complex salt of diazo dyestuff). Silicone was applied to the cloth thus treated in an amount of 5 percent (silicone/fiber) and the cloth was subjected to irradiation of Co 60 $\gamma$-ray in the presence of air and dried 5 hours at 80° C. The cloth thus treated was subjected to an extraction with petroleum benzine for 20 hours and successively rinsed sufficiently with methanol and water and dried. Thereafter the weight of the cloth was measured and the degree of grafting was calculated from the data. The results are tabulated in Table 3. As the controls, nondyed cloth and the cloth dyed with Chryeamine G (a kind of diazo dyestuff) were treated in the same manner and the degree of grafting obtained are also tabulated in Table 3.

TABLE 3

| Sample number | Dyestuff | Conc. of dyestuff (percent) | Irradiation total dose (rad.) | Degree of grafting (percent) | Grafting yield (percent) |
|---|---|---|---|---|---|
| 1 | Solar Rubinol | 2 | 5.2×10⁶ | 4.9 | 97 |
| 2 | do | 2 | 1.3×10⁶ | 4.1 | 92 |
| 3 | do | 2 | 0.7×10⁶ | 4.3 | 85 |
| 4 | do | 2 | 0 | 1.9 | 37 |
| 5 | do | 0.6 | 5.2×10⁶ | 4.9 | 98 |
| 6 | do | 0.6 | 1.3×10⁶ | 4.2 | 84 |
| 7 | do | 0.6 | 0.7×10⁶ | 4.2 | 84 |
| 8 | do | 0.6 | 0 | 0.1 | 2 |
| 9 | Chryeamine | 2 | 4.7×10⁶ | 0.7 | 13 |
| 10 | do | 0.6 | 4.7×10⁶ | 0.7 | 13 |
| 11 | Not dyed | 0 | 4.7×10⁶ | 0.7 | 14 |
| 12 | do | 0 | 0 | 0 | 0 |

Samples No. 9–12 are given for reference purposes only.

EXAMPLE 3

No. 60 cotton broad cloth was dyed using 0.6 percent and 2 percent of Direct Fast Brown BRS (cupro triazo dyestuff).

The cloth thus dyed was treated as in Example 2. The results are tabulated in Table 4.

TABLE 4

| Sample number | Dyestuff | Conc. of dyestuff (percent) | Irradiation total dose (rad.) | Degree of silicone grafting (percent) | Grafting yield (percent) |
|---|---|---|---|---|---|
| 13 | Direct Fast Brown BRS | 2 | $5.2 \times 10^5$ | 43 | 85 |
| 14 | do | 2 | 0 | 0.1 | 2 |
| 15 | do | 0.6 | $5.2 \times 10^6$ | 4.6 | 92 |
| 16 | do | 0.6 | $1.3 \times 10^6$ | 9.0 | 18 |
| 17 | do | 0.6 | $0.7 \times 10^6$ | 5.0 | 10 |
| 18 | do | 0.6 | 0 | 0.2 | 3 |

Example 4

No. 60 cotton broad cloth was dyed using 0.6% and 2% of Direct Fast Turquoise Blue (cupro phthalo cyanine dyestuff). The cloth thus dyed was treated as in Example 2. The results are tabulated in table 5.

TABLE 5

| Sample number | Dyestuff | Conc. of dyestuff (percent) | Irradiation total dose of radiation (rad.) | Degree of grafting (percent) | Grafting yield (percent) |
|---|---|---|---|---|---|
| 19 | Direct Fast Turquoise Blue GL. | 2 | $4.7 \times 10^6$ | 3.5 | 76 |
| 20 | do | 2 | $1.3 \times 10^6$ | 0.7 | 13 |
| 21 | do | 2 | $0.7 \times 10^6$ | 0.4 | 7 |
| 22 | do | 2 | 0 | 0 | 0 |
| 23 | do | 0.6 | $4.7 \times 10^6$ | 1.5 | 29 |
| 24 | do | 0.6 | $1.3 \times 10^6$ | 0.4 | 8 |
| 25 | do | 0.6 | $0.7 \times 10^6$ | 0.3 | 5 |
| 26 | do | 0.6 | 0 | 0 | 0 |

EXAMPLE 5

To compare the degree of silicone grafting of a cloth incorporating a graft copolymer of silicone with some kinds of thermosetting resins and thermoplastic resins, No. 60 cotton broad cloth (not finished), melamine resin, ethylene urea resin, urea resin, and acrylate resin finished No. 60 cotton broad cloth (each piece of cloth containing 5 percent of one of said resins) was subjected to silicone treatment so as to incorporate 5 percent (silicone/fiber) silicone on the cloth. Each of these samples was divided into 2 portions, and one of which was further subjected Co 60 γ-ray in an amount of total dose $4 \times 10^6$ rad. Thereafter, the thus treated cotton cloth was subjected to extraction with petroleum benzine for a predetermined number of hours and successively rinsed sufficiently with ethanol and water and dried. Then the weight of the samples was measured and degree of silicone grafting were calculated. The results are shown in table 6:

TABLE 6

| Sample No | Resin for pretreatment | Irradiation total dose (rad) | Degree of silicone grafting (%) |
|---|---|---|---|
| 1 | melamine resin | $4.0 \times 10^6$ | |
| 2 | melamine resin | 0 | |
| 3 | ethylene urea resin | $4.0 \times 10^6$ | 1.15 |
| 4 | ethylene urea resin | 0 | 0.10 |
| 5 | urea resin | $4.0 \times 10^6$ | 0.80 |
| 6 | urea resin | 0 | −0.27 |
| 7 | acrylate resin | $4.0 \times 10^6$ | 1.40 |
| 8 | acrylate resin | 0 | 0.20 |
| 9 | none | $4.0 \times 10^6$ | 0.95 |
| 10 | none | 0 | 0.08 |

The sample No. 1, 3, 5, 7 and 9 are irradiated samples by γ-ray and shows a higher degree of grafting than the corresponded samples of samples Nos. 2, 4, 6, 8 and 10 respectively. The degree of silicone grafting (3.25 percent) of the melamine finished cloth of sample No. 1 is especially high. Said degree of grafting is significantly higher than that obtained by non radiated sample No. 2 and by sample No. 9 which is a sample of silicone graft-only. Further, a number of commercial drycleanings were carried out on these finished

TABLE 7

| Sample No. | Resin for pretreatment | Irradiation total dose (rad.) | Number of dry-cleaning spray test rating | | | | | |
|---|---|---|---|---|---|---|---|---|
| | | | 0 | 1 | 3 | 5 | 10 | 15 |
| 1 | Melamine resin | $4.0 \times 10^6$ | 100 | 100 | 100 | 100 | 90 | 80 |
| 2 | do | 0 | 100 | 100 | 90 | 80 | 50 | 0 |
| 3 | Ethylene urea resin | $4.0 \times 10^6$ | 100 | 100 | 90 | 80 | 50 | 9 |
| 4 | do | 0 | 100 | 90 | 70 | 0 | 0 | 0 |
| 5 | Urea resin | $4.0 \times 10^6$ | 100 | 100 | 80 | 70 | 0 | 0 |
| 6 | do | 0 | 90 | 80 | 0 | 0 | 0 | 0 |
| 7 | None | $4.0 \times 10^6$ | 100 | 90 | 80 | 0 | 0 | 0 |
| 8 | do | 0 | 70 | 0 | 0 | 0 | 0 | 0 | cloths and after that durability of water proofness was measured in accordance with ASTM test; D583-58 for water repellency. The results are tabulated in table 7.

When samples Nos. 1 and 2 are compared, the superior effect produced by the γ-ray irradiation on silicone melamine resin graft copolymerized cloth is clearly recognized in No. 1. Also, if the properties of product No. 1 are compared with those of No. 7, it is recognized that the properties of No. 1 are far superior to those of No. 7. Said superior properties are the result of the melamine resin pretreatment. Sample No. 7 lacks such pretreatment.

EXAMPLE 6

Silicone was applied in an amount of 5 percent (silicone/fiber) to a No. 60 cotton broad cloth which had been dyed using 2 percent of Direct Fast Turquoise Blue GL (a kind of cupro phthalo cyanine dyestuff). The dyed cloth was subjected to the irradiation of Co 60 γ-ray in the presence of air heated to 75° C. Thereafter, it was dried at 80° C. for 5 hours. The thus treated cotton cloth was then subjected to an extraction with petroleum benzine and successively rinsed sufficiently with methanol and water and dried. The weight of the samples were measured. The results are tabulated in table 8. The effect of higher temperature is shown by comparing samples 2 and 4. In sample 2 the degree of silicone grafting of dyed cloth with a total dose of $1.0 \times 10^6$ rad at 75° C. is 1.17 percent which is higher than the 0.7 percent of the sample 4 given a total dose of 1.3 M rad at 25° C. Also, in sample 2 the degree of silicone grafting of dyed cloth given a total dose of $1.0 \times 10^6$ rad at 75° C. is greater than that of the nondyed sample 6 given a total dose of $1.2 \times 10^6$ rad at 80° C. As previously stated, it is clear that the degree of silicone grafting increases, if irradiation is carried out under heating on a cloth dyed with metal-containing dyestuff.

TABLE 8

| Sample No. | Dyestuff | Irradiation temp. (°C.) | Irradiation total dose (rad) | Degree of silicone grafting (%) |
|---|---|---|---|---|
| 1 | Cupro phthalo cyanine 2% | 75 | $1.5 \times 10^6$ | 1.24 |
| 2 | Cupro phthalo cyanine 2% | 75 | $1.0 \times 10^6$ | 1.17 |
| 3 | Cupro phthalo cyanine 2% | 75 | $0.7 \times 10^6$ | 0.99 |
| 4 | Cupro phthalo cyanine 2% | 25 | $1.3 \times 10^6$ | 0.7 |
| 5 | Cupro phthalo cyanine 2% | 25 | $0.7 \times 10^6$ | 0.4 |
| 6 | none | 80 | $1.2 \times 10^6$ | 0.75 |
| 7 | none | 80 | $0.7 \times 10^6$ | 0.75 |

Sample No. 4-7 are given for reference purposes only.

EXAMPLE 7

Silicone and melamine resin were applied in an amount of 5 percent respectively to No. 60 cotton broad cloth. Said cloth was thereafter subjected to a irradiation of Co 60 γ-ray in the presence of air at a temperature of 75° C., and dried for 5 hours at 80° C. Said samples were tested for durability of water proofness in accordance with ASTM test D583-58 for water repellency. The results are given in table 9.

Using the durability of water proofness obtained by the irradiation of $4.0 \times 10^6$ rad at 25° C. as a standard, it is apparent that heating is useful since it makes it possible to attain the same degree of water proofness with a significantly smaller total dose of irradiation.

TABLE 9

| Sample No. | Irradiation temp. (°C.) | Irradiation total dosage (rad.) | Number of dry-cleaning spray test rating | | | | | |
|---|---|---|---|---|---|---|---|---|
| | | | 0 | 1 | 3 | 5 | 10 | 15 |
| 1 | 75 | $0.7 \times 10^6$ | 100 | 100 | 100 | 100 | 80 | 80 |
| 2 | 75 | $1.0 \times 10^6$ | 100 | 100 | 100 | 100 | 90 | 80 |
| 3 | 75 | $1.5 \times 10^6$ | 100 | 100 | 100 | 100 | 90 | 80 |
| 4 | 25 | 0 | 100 | 100 | 90 | 80 | 50 | |
| 5 | 25 | $4.0 \times 10^6$ | 100 | 100 | 100 | 100 | 90 | 80 |

EXAMPLE 9

Silicone and melamine resin were applied in an amount of 5 percent respectively to No. 60 cotton broad cloth which had been dyed using 2 percent of Direct Fast Turquoise Blue GL (cupro phthalocyanine dyestuff). The cloth samples were subjected to irradiation of Co 60 γ-ray in the presence of air at a temperature of 75° C. The treated samples were further heated for 5 hours at 80° C., and thereafter dried at 80° C. for 5 hours. Said samples were tested for the durability of water proofness in accordance with ASTM test; D583-58 for water repellency test after being subjected to commercial drycleaning. The results are given in table 10. Using the product obtained by the irradiation of $4.0 \times 10^6$ rad at 25° C., as a standard, it is clear that almost the same durability of water proofness is obtained with only $0.7 \times 10^6$ rad irradiation at 75° C. with melamine resin finish.

TABLE 10

| Sample No. | Resin | Irradiation temperature (°C.) | Irradiation total dosage (Mrad.) | Times of dry-cleaning spray test rating | | | | | |
|---|---|---|---|---|---|---|---|---|---|
| | | | | 0 | 1 | 3 | 5 | 10 | 15 |
| 1 | Melamin | 75 | 0.7 | 100 | 100 | 100 | 90 | 80 | 80 |
| 2 | do | 75 | 1.0 | 100 | 100 | 100 | 90 | 80 | 80 |
| 3 | do | 75 | 1.5 | 100 | 100 | 100 | 100 | 90 | 80 |

While in the foregoing specification this invention has been described in relation to preferred embodiments thereof, and many details have been set forth for the purpose of illustration, it will be apparent to those skilled in the art that the invention is susceptible to other embodiments and that many of the details set forth herein can be varied considerably without departing from the basic principles of the invention.

What is claimed is:

1. In a process for preparing a silicone graft copolymerized fiber or cloth by copolymerizing silicone having a general formula of

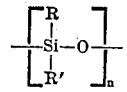

wherein R and R' are hydrogen or alkyl radicals having up to five carbon atoms and R and R' can be the same or different, and $n$ is an integer, with a cloth having a molecular construction which can form free radicals within a molecule upon exposure to ionizing radiation, by irradiation of said silicone and said cloth, the improvement which comprises dyeing said cloth with a dyestuff containing metal in the form of complex salt, then applying said silicone to the dyed cloth and subjecting said silicone coated dyed cloth to an ionizing radiation wherein the dosage of said ionizing radiation is within a range of from $10^4$ rad. to $10^7$ rad.

2. A process as claimed in claim 1 wherein said cloth is cotton cloth.

3. A process as claimed in claim 1 wherein said irradiation is carried out at a temperature within a range from above room temperature but below the maximum temperature the cloth can withstand without destruction.

4. A process as claimed in claim 2 wherein said irradiation is carried out at a temperature within a range from room temperature to 150° C.

5. A process as claimed in claim 1 wherein said cloth is selected from the groups consisting of rayon, cupra and acetate and said irradiation is carried out at a temperature up to 200° C.

* * * * *